Oct. 23, 1956

V. G. VAUGHAN ET AL 2,768,342

MOTOR PROTECTIVE SWITCH

Filed March 9, 1953

Inventors;
Victor G. Vaughan,
John B. Duffy,
by Townsend M. Gunn.
Atty.

Oct. 23, 1956   V. G. VAUGHAN ET AL   2,768,342
MOTOR PROTECTIVE SWITCH

Filed March 9, 1953

*Inventors;*
*Victor G. Vaughan,*
*John B. Duffy,*
*by Townsend M. Gunn,*
*Atty.*

United States Patent Office 2,768,342
Patented Oct. 23, 1956

2,768,342

MOTOR PROTECTIVE SWITCH

Victor G. Vaughan, Attleboro, and John B. Duffy, Foxboro, Mass., assignors to Metals & Controls Corporation, Attleboro, Mass., a corporation of Massachusetts Application March 9, 1953, Serial No. 340,996

7 Claims. (Cl. 318—221)

This invention relates to thermostatic switches, and with regard to certain more specific features, to thermostatic switches having two heaters therein for the control of electric motors.

In the protection of electric motors by thermostatic switches mounted on the motors so as to be subject both to the heat of the motor and to the current actuating the motor (so-called inherent overheat protection), there are several types of motor operation, when so protected, in which the ordinary system used is adequate to keep the motor from burning out. As presently developed in the industry, the average motor protector thermostat provides protection for the three following conditions: (1) Running overloads of motor; (2) locked rotor conditions with both windings of the motor connected to the voltage supply; (3) locked rotor conditions when the main winding only of the motor is connected to the voltage supply.

There is also a fourth condition which may be described as that arising when the motor runs with its starting winding remaining connected to the line, that is, the motor operates with both windings remaining connected to the voltage supply. Such a condition can arise, for example, when the motor is so heavily overloaded that it cannot attain a sufficient speed to have the starting winding relay open the circuit to the starting winding, and yet the motor is not so heavily loaded that the rotor is stalled; or when the starting switch fails in the closed position. These conditions may frequenly occur, for example, as to motors used for water pumps. In the first case, the load conditions in a pump can be such that it is very possible that the pump motor may run with both windings connected in circuit, the motor never reaching a speed sufficient to have the starting winding cut out.

In the second case, trouble can arise in water supply systems, where there may be present one or more leaking valves or faucets, or other leakages somewhere in the system. The result of the leak is to drop the pressure in the system, and the pressure switch cycles the pump motor on and off an unusual number of times. (As many as 200 starts and stops of the pump motor in a single hour have been recorded.) This very frequent starting tends to burn out the centrifugal starting switch, and depending on the manner in which this switch fails, two things can happen: (1) If the starting switch burns out or fails in the open position, then the motor situation is that of a locked rotor with only the main winding in the circuit. Under this condition, the current through the main winding will be sufficient to actuate the standard type of motor protective device in order to keep the motor windings from burning out. (2) If the centrifugal switch fails in a closed position, then the situation is that of the fourth condition above but in which the motor is running somewhere near rated speed with both the main winding and the starting winding energized. Under this condition, the current through the main winding is low (because of the back electromotive force induced in that winding of the motor) and may not be sufficient to cause the motor protective switch to open the circuit to the motor. Meanwhile, however, the starting winding is drawing approximately full current and heats rapidly to the burnout temperature.

Protective switches have been made to protect the motor against overheating in such cases, among which are those incorporating two heaters in the thermostatic switch. Such attempts have not been entirely satisfactory, however. They either fail to protect the motor; or they overprotect, and thus cause inefficient use of the motor.

It is the general object, therefore, of this invention to provide a two heater thermostat of such design that, when properly connected in the motor circuit, it will protect the motor in said fourth condition as well as in the three conditions earlier set forth, without over-protecting the motor in any of these situations. The thermostat of this invention is constructed with two heaters for heating the thermal element, with one of the heaters placed closely adjacent to the thermal element and the other heater being mounted relatively remotely of the thermal element. The heater close to the thermal element is connected in series with the motor winding having the greater current density (usually the starting winding), and the other heater is connected in series with the winding having the lesser current density (usually the running winding). In said fourth condition and in said locked rotor conditions (in both of which cases both windings of the motor remain connected in the circuit), the current from the starting winding in passing through the heater which is placed close to the thermal element will raise the heater temperature rapidly. This in turn heats the thermal element rapidly to cause the latter to open the thermostat contacts, and thus disconnect the motor from the voltage supply in a relatively short time. The other (remote) heater of the thermostat is mounted in such position in respect to the thermal element of the switch that its heating of the thermal element is at a positive but relatively slow rate; this heater will, over a relatively long period of time, heat the thermal element to the point that the thermal element opens. That is, the remote heater takes care of situations where the electrical current is not as high as in the locked rotor conditions, but is high enough to damage the motor over a relatively long period. This second heater is generally connected to the running winding of the motor (as indicated above), and the combination of this second heater and the thermal element accomplish protection of the motor under conditions 1 and 3 first mentioned above.

Among the various objects of the invention, therefore, may be noted the provision of a novel thermostatic electric switch which is adapted to break an electrical circuit on rise of electrical current above a value injurious to the circuit; the provision of a thermostatic electric switch of the class described including separate additional heating means, each heating means being responsive to the current in separate parts of the electrical circuit; the provision of electrical switch of the class described which includes means providing adequate space in the mounting base for the allowance of a predetermined arrangement of electrical heating units in respect to the thermostatic element which is also mounted in the base; the provision of an electrical switch of the class described which is particularly adapted to the use of a motor overload protective device in motors where one of the windings may have a relatively high current density and the other winding may have a relatively low current density; and the provision of thermostatic electric switch of the class described which is simple and economical in construction, and efficient and reliable in operation. Other objects will be in part obvious and in part pointed out hereinafter.

The invention accordingly comprises the elements and combinations of elements, steps and sequence of steps, features of construction, and arrangements of parts, which will be exemplified in the accompanying drawings, and the scope of the application of which will be indicated in the following claims.

In the accompanying drawings in which are illustrated several of various possible embodiments of the invention:

Similar reference characters indicate corresponding parts throughout the several views of the drawing.

Referring now more particularly to the drawings for a detailed description of the invention, numeral 1 indicates a base member, preferably made of molded electrical insulating material which is heat resistant to a fair degree, such as phenolic condensation products or the like. Five holes, 2, 3, 4, 5 and 6, respectively, are provided in the base 1 for the purpose of receiving terminal structures and an adjusting post or screw. An upstanding skirt 7, preferably an integral part of the base, is provided for the purpose of insulating the parts contained in the cup so formed, and for preventing flash-over to ground. Ears 8 and 9 are provided for attaching the base to a motor.

Figure 6:
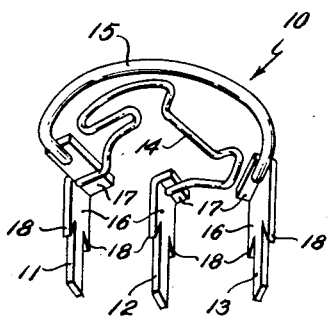
Fig. 6 is a perspective view of a heating wire assembly prior to its incorporation in the switch.

Referring now to Fig. 6, there is shown in perspective view the heater assembly (indicated generally by numeral 10) which is incorporated in the above-described base. Heater assembly 10 comprises the three terminals 11, 12, and 13, and the two heaters 14 and 15. Heater 14 is smaller in diameter than heater 15 and has a higher resistance. It will be observed by reference to Fig. 1 that heater 14 is so formed and mounted that it lies within the area circumscribed by heater 15. Heater 14 is connected at one end to terminal 11 and the other end connected to terminal 12. Heater 15 also has one end connected to terminal 11 while the other end is connected to terminal 13.

In regard to the aforementioned connections, it will be observed that each of the terminals 11, 12 and 13 comprises a flat shank portion 16 and a bent-over portion 17, acting as a head or contact face. The shanks 16 have spurs 18 as shown. The respective heater ends are fastened to these terminal structures by being welded or hard soldered to the under side of the bent-over contact faces 17 as shown. Of the two methods of attaching, welding is preferred.

Figure 1:
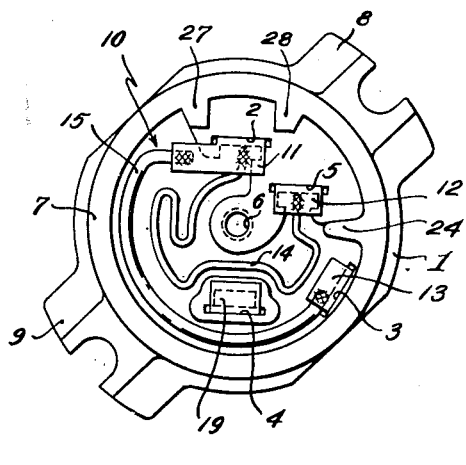
Fig. 1 is a plan view of the interior of a switch embodying the present invention, the thermal element being removed.
Figure 2:
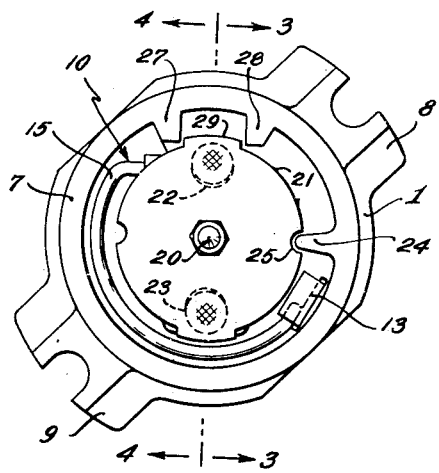
Fig. 2 is a view similar to Fig. 1, but with the thermal element in place.
Figure 3:
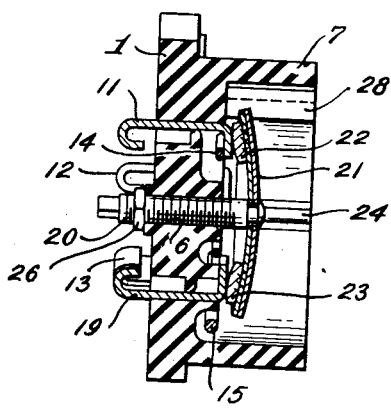
Fig. 3 is a sectional elevation of the switch of Fig. 2, viewed in the direction indicated by sight line 3—3 of Fig. 2.
Figure 4:
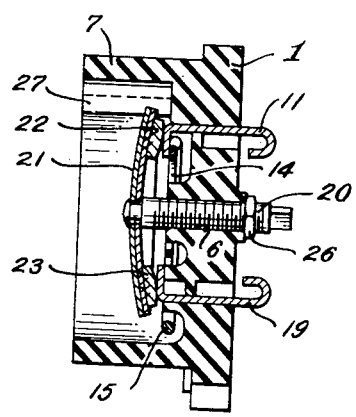
Fig. 4 is a sectional elevation of the switch of Fig. 2, taken in the direction indicated by sight lines 4—4 of Fig. 2.
Figure 5:
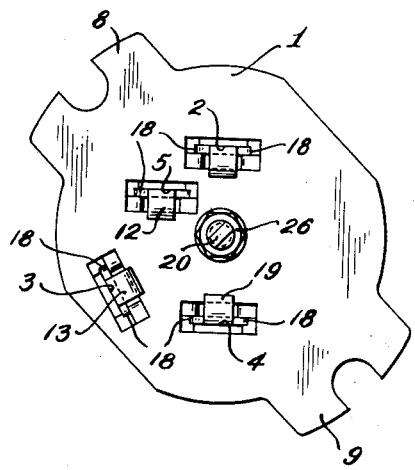
Fig. 5 is a bottom plan view of the Fig. 2 switch.

Heater assembly 10 is mounted in base 1 as shown in Fig. 1, with the bent-over contact faces 17 on the inside of the cup-like base, and is fastened in the base by staking the shank spurs 18 of each terminal against the base. An additional terminal 19 is likewise inserted and similarly fastened in hole 4 provided in base 1. It will be observed that as so mounted, terminal 19 and terminal 11 are diametrically opposite each other across the central hole 6. It will also be noticed that, as arranged, heater 15 lies closely adjacent to the rim or skirt 7 and lies on the outside of terminal 19. Thus heater 15 is mounted remotely of the thermal element 21.

Threaded into hole 6 is an adjusting screw 20. Mounted on the inner end of screw 20 is a composite thermostat metal element 21, which may be, for example, a dished bimetallic snap-acting thermostatic disc of the type shown and described in Spencer Patent No. 1,448,240, or in the Vaughan et al. Patent No. 2,317,831. Among the several characteristics of such discs is that when properly formed they have one position of stable equilibrium when cold and another relatively stable position of equilibrium when hot, the hot and cold positions having opposite curvatures. However, it is within the purview of this invention that non-snap acting thermostat elements or plates may be used. The thermostat element 21 is mounted on screw 20 by means of proper shoulders or abutments and a headed over end, all as described in said patents. As thus mounted, element 21 is free to rotate on screw 20, and thus screw 20 may be turned to adjust the operating temperature of the plate without turning the plate itself.

Welded to the high expansion side of thermostat element 21 are diametrically opposite contact buttons 22 and 23, as described in said Patent No. 2,317,831. Because these contacts 22 and 23 are welded to element 21, they are in good electrical connection therewith. Their distance apart is such that contact 22 makes contact with terminal 11, and contact 23 makes contact with terminal 19.

It will now be noticed that the size of thermostat element 21 is such that substantially all of heater 14 is closely covered by it and therefore the thermostat element is adapted to receive rapidly direct radiation from heater 14 as well as heat by convection; whereas, on the contrary, heater 15 is at or beyond the periphery of the thermostat element 21, and therefore the element will receive both radiated and convected heat at a much slower rate from heater 15 than it does from heater 14.

For the purpose of guiding thermostat element 21 in the base in order to keep it from rotating and therefore from misaligning contacts 22 and 23 from their respective terminals 11 and 19, a projection 24, on the inner wall of skirt 7 as shown, is provided and adapted to fit into a recess 25 provided in the edge of the element as shown.

After the thermostat element 21 has been adjusted for proper temperature response by turning post 20 one way or the other (as is known in the art), a lock nut 26 is provided and tightened in order to prevent adjusting post 20 from thereafter turning.

In the event that a form of thermostat element is used, or an element of such size, that projection 24 does not reach the element, then the proper guidance may be given by the opposing projections 27 and 28 on the inner side of skirt 7 so arranged that they receive in the space between them a projecting tab 29 which may be provided on the element.

Figure 7:
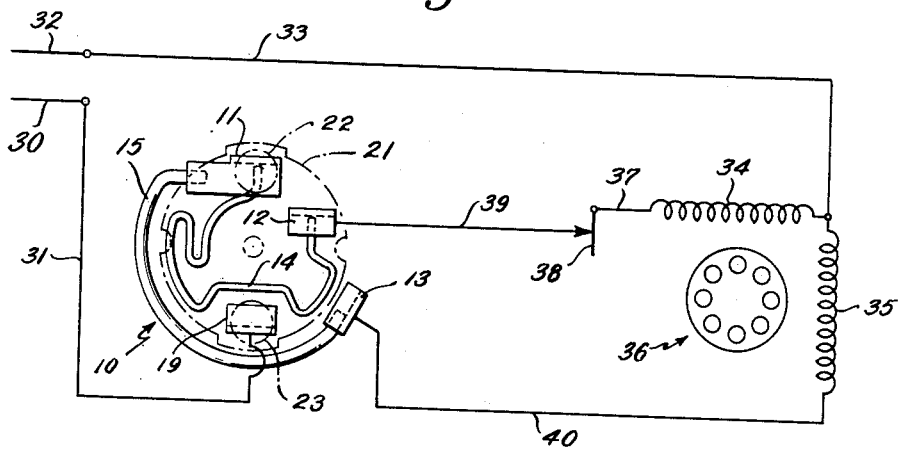
Fig. 7 is a circuit diagram.

Fig. 7 shows the circuit connection for the switch of the present invention. One power supply wire 30 is connected by wire 31 to the end of terminal 19; the other power supply line 32 is connected by wire 33 to the common connection between the starting winding 34 and the running winding 35 of the motor indicated generally by numeral 36. The other end of starting winding 34 is connected by wire 37 to a disconnect switch (indicated schematically by numeral 38) and then by wire 39 to the outer end of terminal 12. The other end of the running winding 35 is connected by wire 40 to the outer end of terminal 13.

As thus connected, it will be observed that the current in the starting winding comes from one side 32 of the line, through wire 33, starting winding 34, switch 38, wire 39, terminal 12, heater 14, terminal 11, contact 22, thermostat element 21, contact 23, terminal 19, wire 31 and back to line 30. Current through the running winding comes from line 32, wire 33, through running winding 35, wire 40, terminal 13, heater 15, terminal 11, contact 22, thermostat element 21, contact 23, terminal 19 and thence to line 30 by wire 31. Thus it will be observed that heater 15 is in series with the running winding 35, and heater 14 is in series with the starting winding 34. Both heaters and the respective windings are in series with the thermostat element 21.

The operation of the device is as follows:

Under normal operating conditions of the motor, the heat generated by the current passing through the thermostat element 21 and the heating elements 14 and 15, together with the heat of the motor, will not be sufficient to raise the temperature of the element 21 to the point where it snaps to its position of opposite concavity (if it is the snap-acting type) or moves a distance (if it is the creep-type) to open the electrical contacts. If, however, the motor is so heavily overloaded that the rotor cannot turn, then the heavy starting and running winding currents will influence their respective heaters 14 and 15 as well as the thermostat element 21, to cause the element 21 to move to open the circuit to both windings, thus protecting the motor from overheating. If, on the other hand, the motor has been running and the starting winding is not in the circuit, and then the motor becomes overloaded, the excess current in the running winding will raise the temperature of heater 15 as well as the thermal element 21, and (according to the calibration of the thermostat) the effect of heater 15 on element 21 will, after a time, be sufficient to cause the element 21 to move to open the circuit before the windings are damaged.

Said fourth condition, as mentioned above in this application, is that condition where the motor is running but at such a low speed that both the starting winding and the running winding are in the circuit. If the motor should operate in this fashion, then it will be observed that the relatively heavy current in the starting winding again has a rapid direct influence on the thermostat element 21 both because it traverses it and also because this current rapidly heats heating element 14 which, being mounted close to the element 21 and covered by it, rapidly heats the element 21 to the contact separating point. It is for this reason that heater 14 is placed within the coverage of the element 21, and between it and the base 1. So mounted, the influence of the temperature of heater 14 is very quickly felt by thermal element 21. As noted above, however, heater 15 is placed a distance away from the element 21, and thus heater 15 has its influence primarily for those conditions where the current is not so high, and the motor heats at a relatively slow rate and therefore can operate for a relatively long time without overheating and burning out. Thus, the motor will be protected in all of the situations outlined above, without being over-protected in any situation.

In the above description, we have specified that heater 14 is connected to the starting winding of the motor and that heater 15 is connected to the running winding. This is by way of example. In the usual split-phase motor the starting winding has the greatest current density, and it is for this reason that the above circuit connection is used for descriptive purposes. In all cases, heater 14 should be connected to that winding which, under the conditions at which it is desired to protect the motor, has the greatest current density.

In view of the above, it will be seen that the several objects of the invention are achieved and other advantageous results attained. As many changes could be made in carrying out the above constructions without departing from the scope of the invention, it is intended that all matter contained in the above description or shown in the accompanying drawings, shall be interpreted as illustrative and not in a limiting sense.

We claim:

1. A thermostatic switch comprising a base; a thermostat element mounted on said base; at least three terminals mounted in said base; and at least two heaters mounted on said base, both of said heaters being located on the same side of said element with an end of one heater being connected to one terminal, an end of another heater being connected to another terminal, both of the other ends of said heaters being connected to a third terminal, and both of said heaters being disposed in heat-transfer relation to said thermostat element; said thermostat element being adapted to open and close a circuit to said third terminal; and one of said heaters being mounted close to said thermal element and the other of the heaters being mounted away from said thermal element, both of said heaters lying in substantially the same plane and one of said heaters lying outside the other of said heaters.

2. A thermostatic switch comprising a base; a snap-acting composite thermostat metal plate mounted on said base; at least three terminals mounted on said base; and at least two heaters mounted on said base, both of said heaters being located on the same side of said plate with one end of one heater being connected to one of said terminals, an end of another heater being connected to another terminal, both of the other ends of said heaters being connected to a third terminal, and both of said heaters being disposed in heat-transfer relation to said snap-acting plate; said snap-acting plate being adapted to open and close a circuit to said third terminal; and one of said heaters being mounted between said snap-acting plate and the base, and the other of said heaters being mounted adjacent the peripheral edge of said plate and in substantially the same plane as said one heater.

3. A thermostatic switch comprising a base; a snap-acting composite thermostat disc centrally mounted on said base; at least four terminals mounted on said base; and at least two heaters mounted on said base, both of said heaters being located on the same side of said disc with one end of one heater being connected to one of said terminals, one end of another heater being connected to another terminal, and both of the other ends of said heaters being connected to a third terminal; said third terminal and a fourth terminal being mounted diametrically opposite to each other in respect to said base; said snap-acting disc connecting, in one position of stability, said third and fourth terminals; and one of said heaters lying between said thermostatic element and said base, and the other of said heaters lying outside the perimeter of said snap-acting disc.

4. The thermostatic switch of claim 3 in which the heater which lies between the snap-acting plate and the base has a higher resistance than the heater which lies outside the perimeter of said snap-acting element.

5. A thermostatic switch for the protection of a motor having at least two windings one of which has a greater current density than the other under certain operating conditions, comprising a cup-like base having a bottom and an upstanding skirt; an adjusting post adjustably mounted on said bottom; a snap-acting thermostat element centrally carried by said post; electrical contacts carried by and in electrical engagement with said element; at least four terminals mounted on said bottom with each of said terminals ending in a contact face within said base; and at least two heater elements mounted within said base on the same side of said element, with one end of each of two heaters being connected to a first contact face, the other end of each of said two heaters being connected to second and third contact faces, and with the first of said heaters lying between said element and said bottom in relatively close proximity to said element, and the second of said heaters lying outside the perimeter of said element; and one of said electrical contacts making contact with said first contact face, and the other of said electrical contacts making contact with a fourth contact face, whereby said element when in one of its positions electrically connects said first and fourth contact faces, and when in the other of its positions electrically disconnects said last named contact faces.

6. In combination, an electrical energy translating device having two windings one of which has, during operating conditions, a greater current density than the other; and a thermostatic switch for protecting the motor against overheating, said switch comprising a base, at least two heater elements mounted on said base, and a thermostat element mounted on the base and adapted to make and break an electrical connection between a power supply and said heaters, both of said heaters being located on the same side of said element; a first of said heaters being mounted between said thermal element and said base, and a second of said heaters being mounted at or outside the vertical projection of the periphery of said element on said base; and connecting wires connecting said first heater in series with said winding having the greater current density, and connecting said second heater in series with said winding having the lesser current density.

7. A thermostatic switch comprising a base; a snap-acting composite thermostat element mounted on said base; at least four terminals mounted on said base; and at least two heaters mounted on said base, the ends of both of said heaters being connected to terminals between said base and said thermostat element, with one end of one heater being connected to one of said terminals, one end of another heater being connected to another terminal, and both of the other ends of said heaters being connected to a third terminal; said third terminal and a fourth terminal being mounted diametrically opposite to each other in respect to said base; said snap-acting element connecting, in one position of stability, said third and fourth terminals; and one of said heaters lying between said thermostatic element and said base, the other of said heaters lying outside the perimeter of said snap-acting element, and both of said heaters being disposed in heat-transfer relation to said snap-acting element.

References Cited in the file of this patent

UNITED STATES PATENTS

| | | |
|---|---|---|
| 1,763,137 | Dorfman | June 10, 1930 |
| 2,333,536 | Lee | Nov. 2, 1943 |
| 2,414,531 | Johns | Jan. 21, 1947 |